United States Patent [19]
Bauknecht et al.

[11] 3,822,631
[45] July 9, 1974

[54] TRIMMING DEVICE FOR GEAR HOBBING MACHINE

[75] Inventors: Otto Bauknecht, Friedrichshafen; Albert Bleyer, Tettnang-Dietmannsweiler; Adolf Horl, Friedrichshafen, all of Germany

[73] Assignee: Zahnradfabrik Friedrichshafen AG, Postfach, Germany

[22] Filed: Aug. 3, 1972

[21] Appl. No.: 277,570

[30] Foreign Application Priority Data
Aug. 7, 1971 Germany............................ 2139737

[52] U.S. Cl..................... 90/1.4, 29/97.5, 90/1.6 A
[51] Int. Cl. ........................ B23f 19/10, B23f 21/28
[58] Field of Search................ 90/1.4, 1.6 R, 1.6 A; 29/97.5

[56] References Cited
UNITED STATES PATENTS

| | | | |
|---|---|---|---|
| 2,787,195 | 4/1957 | Topolinski | 90/1.4 |
| 3,054,331 | 9/1962 | Laessker | 90/1.4 |
| 3,068,758 | 12/1962 | Charvat | 90/1.4 |

*Primary Examiner*—Andrew R. Juhasz

[57] ABSTRACT

The invention provides a trimming cutter mechanism for trimming the conical face at the ends of the teeth of a gear being hobbed. The arrangement includes a hydraulically operated linearly movable holder which can be advanced into cutting engagement, and withdrawn, in synchronization with the feeding and withdrawal movement of the gear work piece. Also included is a mount for the cutter which can automatically adjust to the angle of the tooth ends.

7 Claims, 4 Drawing Figures

TRIMMING DEVICE FOR GEAR HOBBING MACHINE

In prior art devices, the ridge or burr which develops on tooth ends while a gear is being hobbed occurs on the hob entrance side of the teeth. It is necessary in prior art devices to remove this ridge or burr by a special machine which had to be adjusted to the tooth end angle. This requires additional labor steps and additional expense. The present invention is automatic in adjusting to the trimming angle and avoids the loss of time, and labor, and effects a manufacturing economy.

In prior art devices where bevel gears are cut, deburring attachments have heretofor been used attached to the gear cutting machine where the deburring or trimming tool was hydraulically driven responsive to the pitch movement of the machine. Accordingly, it is not broadly new to control a trimming cutter in response to a function of a gear cutting machine. The trimming cutter of the present invention can be operated hydraulically in accordance with prior art teaching.

The present invention relates to deburring by means of a trimming tool to be controlled by a function of the gear cutting machine wherein hydraulic pressure which moves the trimming tool is responsive to hydraulic pressure already present in the machine, for example, for hob or work piece movement. The invention is a mount attached to the machine bed and operates automatically to eliminate the burrs which occur during the course of hobbing so that at the end of the hobbing operation no burr exists due to the constant trimming provided by the invention as the teeth are being hobbed.

The invention is usable with both spur and bevel gears which may then be finished by means of a curling process.

In general, the construction disclosed herein comprises a hydraulically operated slidable carrier which carries a trimming cutter, and which is adjustably mounted on a gear hobbing machine so that adjustment can be made in the direction of the carrier movement relative to the teeth of a gear workpiece.

In a preferred embodiment of the invention, the trimming cutter is mounted on the carrier so that it can pivot automatically to adjust itself to a particular angle of conicity of the hob entrance end of a gear workpiece.

The invention is particularly advantageous in that due to the continuous trimming of burrs as the teeth are being cut by the hob, the burrs or ridges at the front ends of the teeth are not pressed into the spacings between the teeth, a drawback which occurs with conventional burr trimming devices. Thus, each tooth in turn has its end face deburred as the workpiece rotates in the hobbing machine.

A detailed description of the invention now follows in conjunction with the appended drawing in which.

Figure 1:
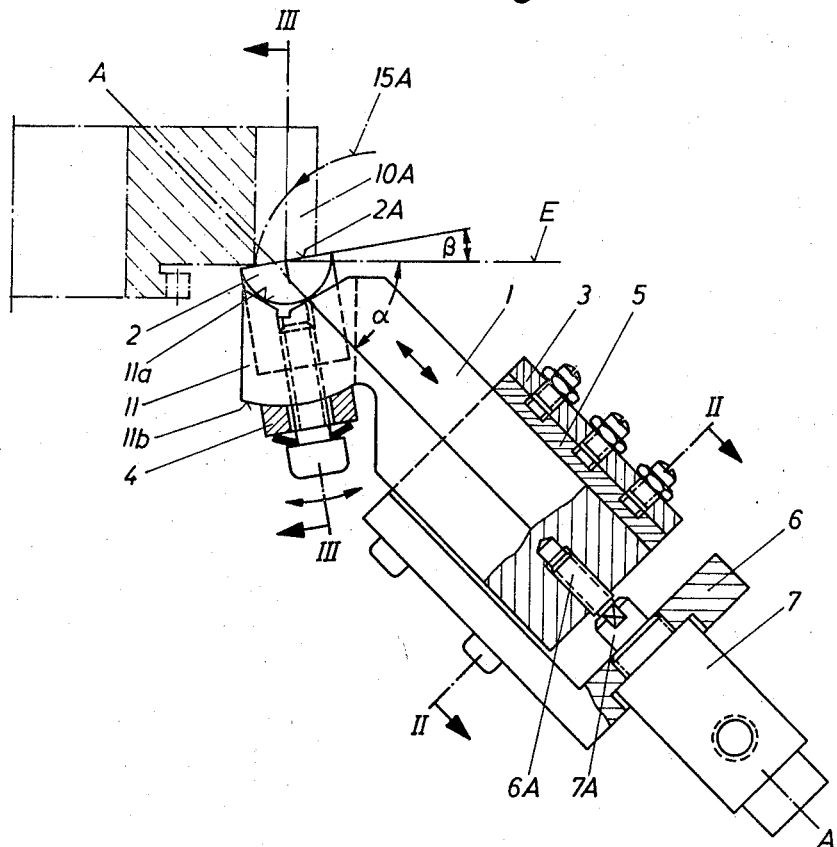
FIG. 1 is a longitudinal view partially in section showing the essential components of the invention in relation to a workpiece being hobbed and is a section taken on the line I—I of FIG. 4.
Figure 2:
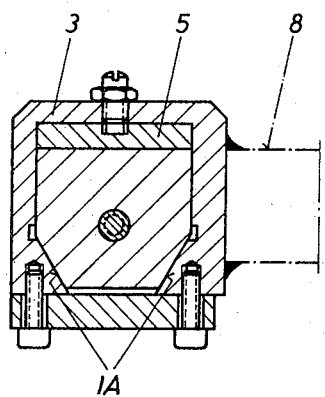
FIG. 2 is a section through the carrier and its support, on the line II—II of FIG. 1.
Figure 4:
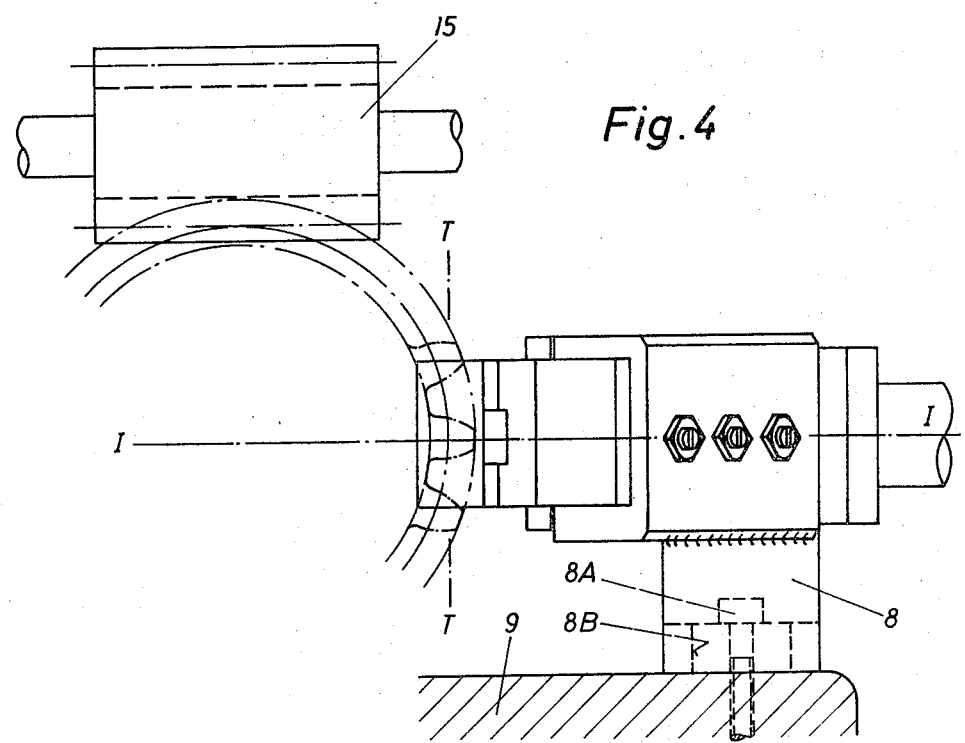
FIG. 4 illustrates the attachment of the invention on a hobbing machine.

Referring now to FIGS. 1, 2 and 4, a channel type housing 3 is illustrated secured as via bracket 8 to the bed 9 of a hobbing machine. The bracket is secured by screws 8A passing through oblong apertures 8B whereby the bracket is adjustable on the machine bed.

A slideable carrier 1, axially movable in housing 3 in the direction of its longitudinal axis A—A, carries a burr trimming cutter 2, having a cutting edge 2A. The axis A—A makes an acute angle $\alpha$ with a plane E which is perpendicular to the rotational axis of the gear workpiece 10.

Figure 3:
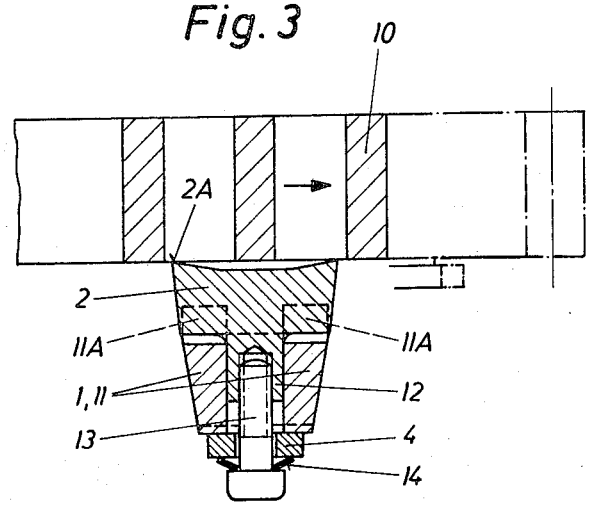
FIG. 3 is a section on the broken section line III—III of FIG. 1 and also indicated as a section on the line T—T of FIG. 4.

The carrier 1 has a fork shaped end 11 to carry the trimming cutter 2 which is pivotally mounted so that its cutting edge 2A can always automatically adjust itself at the conicity angle $\beta$ at the ends of the teeth of the workpiece. This is the entrance end of the hob 15 into the workpiece. It will be noted that the edge 2A can automatically adjust to the angle $\beta$ and is prevented by its transverse shape (FIG. 3) from engaging one-sidely at any angle $\beta$, which might cause breakage, as the workpiece moves in the direction of the arrow. Thus, the entering side of the gear hob 15 is where the burrs or ridges occur which are to be trimmed by the cutting edge 2A.

As seen in FIG. 1 the arcuate arrow 15A indicates the path of the hob 15 into the work piece at the tooth 10A. It will be seen that the teeth are cut by the hob and then progress (FIG. 4) to the trimming cutter.

The housing 3 (FIGS. 1 and 2) is channel or U-shaped and has a bottom closure plate 6 secured as by bolts as shown and which is angle shaped so as to effect a flange which carries the hydraulic cylinder 7 having the piston rod 7A secured as by a screw 6A to the trimming cutter carrier 1. A smooth sliding fit of the cutter carrier within the housing 3 is effected by a shim plate 5 secured by screws and lock nuts 5A and 5B, respectively, so that the carrier slides on the beveled surfaces 1A of housing 3, the carrier having complementary sloping surfaces for engagement therewith.

The trimming cutter tool 2 has a semi-circularly shaped head (FIGS. 1 and 3) rotatively carried on four sloping surfaces 11A at one side of the fork end 11 of the cutter carrier 1. The cutter has an extending tongue 12 protruding into the forked end and a cap screw 13 secures the cutter to the carrier 1. The cap screw passes through a concavely shaped bushing 4 and a dish spring 14. The other side of fork end 11 has a convex shape engaged by the concavity of bushing 4. Thus, there are two cylindrical curved bearing surfaces 11B (FIG. 1) which engage the concavely curved bushing 4 so that the cutter 2 can rotate about the center of curvature of the surfaces 11B while being held in position on the beveled surfaces 11A by spring 14.

The screw 13 is only lightly tightened but is sufficiently tight to maintain a smooth sliding fit for pivoting action of the cutter on the concave surfaces and on the sloping surfaces so that the cutter in engaging the ends of teeth will automatically adjust itself to the conicity of the angle $\beta$.

From the above it will be apparent that pressure can be applied to the cylinder 7 in either direction to move the carrier 1 for trimming engagement of the workpiece or for disengagement in response to hydraulic pressure being used to operate some other part of a hobbing machine. For example, in a hobbing machine having a magazine for the workpieces, the cylinder 7 can be automatically controllable responsive to movements of the saddle to advance the trimming cutter. The control signal for withdrawing the saddle after advance can also be utilized to withdraw the carrier 1 and the workpiece can then be conveyed through the machine without being impeded by the trimming cutter 2.

In retrospect, the invention provides a reversibly slidable carrier having an end bifurcation accommodating the tongue of a T-shaped trimmer having half moon shaped side cheeks which can rotate on respective pairs of flat support surfaces effected by the edges of one end of the bifurcation. The support surfaces form a V-shaped trough but need not be identical in each pair nor at the same angle with respect to the axis of the tongue. The opposite edges of the bifurcation are rounded to be engaged by a spring pressed guide bushing which can accommodate itself to whatever angle the cutting edge of the trimmer is forced to take by virtue of its engaging against the sloping tooth ends. The accommodation of the cutting edge is thus automatically maintained and no adjusting steps are necessary.

What is claimed is:

1. A trimming cutter device comprising a carrier and mounting means therefor in which said carrier is slidably and reversibly movable; said carrier having a forked end; a trimming cutter having a tongue extending into said forked end; securing means resiliently securing said tongue therein; said forked end having sloping surfaces and said trimming cutter having rounded surface means engaging respective sloping surfaces whereby said trimming cutter is pivotally movable with respect to said forked end by engagement with the sloping ends of teeth of a gear workpiece to conform with the angularity thereof.

2. A device as set forth in claim 1, said securing means comprising curved surface means on said forked end and guide means carried by said tongue in slidable engagement with said curved surface means including spring means effecting said engagement.

3. A device as set forth in claim 2, said guide means comprising a bushing having a concave surface, said curved surface means comprising a convex surface engaged by said concave surface of said bushing; a screw secured to said tongue and extending outwardly of said forked end and passing through said bushing; said spring means comprising a spring member secured by said screw against said bushing.

4. A trimming cutter mechanism comprising a reversibly slidably trimming cutter carrier having an end provided with planar support surface means for a trimming cutter; a trimming cutter having cylindrical surface means carried on said support surface means; said support surface means and said trimming cutter surface means being engaged so that said trimming cutter can be pivoted on said carrier for adjustment to the sloping ends of teeth of a gear workpiece; and securing means securing said trimming cutter to said carrier.

5. A trimming cutter mechanism as set forth in claim 4 said securing means comprising engaged cylindrical surfaced members respectively carried by said cutter and said carrier and said latter surfaces being relatively slidably during said adjustment of said cutter.

6. A trimming cutter mechanism comprising a reversibly slidably trimming cutter carrier having an end provided with support surface means for a trimming cutter; a trimming cutter having surface means carried on said support surface means; said support surface means and said trimming cutter surface means being arranged so that said trimming cutter can be pivoted on said carrier for adjustment to the sloping ends of teeth of a gear workpiece; and securing means securing said trimming cutter to said carrier, said end of said carrier having a bifurcation comprising edges effecting said support surface means and being flat and there being a pair of said surfaces in angular relation on each side of said bifurcation; said trimming cutter being T-shaped and comprising a tongue protruding into the bifurcation with laterally extending portions effecting the surface means of said trimming cutter and said portions being cylindrical for engagement with respective pairs of flat support surfaces; said securing means extending into said bifurcation and being connected to said tongue and having slidable bearing support on edges of said bifurcation opposite to the edges effecting said pairs of flat support surfaces.

7. A trimming cutter mechanism as set forth in claim 6, said securing means being adjustable to permit pivotal movement between the surface means of said carrier and the surface means of said trimming cutter.

* * * * *